(12) United States Patent
Riley (10) Patent No.: US 11,125,557 B1
(45) Date of Patent: Sep. 21, 2021

(54) SELF-LEVELLING LASER DIVIDER

(71) Applicant: Vann Riley, Garden Ridge, TX (US)

(72) Inventor: Vann Riley, Garden Ridge, TX (US)

(*) Notice: Subject to any disclaimer, the term of this patent is extended or adjusted under 35 U.S.C. 154(b) by 117 days.

(21) Appl. No.: 16/751,909

(22) Filed: Jan. 24, 2020

Related U.S. Application Data (60) Provisional application No. 62/796,164, filed on Jan. 24, 2019.

(51) Int. Cl.
*G01C 15/00* (2006.01)

(52) U.S. Cl.
CPC ......... *G01C 15/004* (2013.01); *G01C 15/008* (2013.01)

(58) Field of Classification Search
CPC .... G01C 15/004; G01C 15/008; G01C 15/02; G01C 15/04; G01C 15/105
USPC .................................. 33/286, 281, 290, 291
See application file for complete search history.

(56) References Cited

U.S. PATENT DOCUMENTS

| | | | | |
|---|---|---|---|---|
| 5,748,306 | A | * | 5/1998 | Louis ...................... G01B 11/26 356/153 |
| 5,864,956 | A | * | 2/1999 | Dong ................... G01C 15/105 33/227 |
| 5,872,657 | A | * | 2/1999 | Rando .................. G01C 15/004 359/629 |
| 6,941,665 | B1 | * | 9/2005 | Budrow ............... G01C 15/008 33/286 |
| 7,013,571 | B2 | | 3/2006 | El-Katcha et al. |
| 7,266,898 | B2 | | 9/2007 | El-Katcha et al. |
| 7,363,716 | B1 | * | 4/2008 | Tonkinson ............. A47G 1/205 33/286 |
| 7,690,124 | B1 | | 4/2010 | Henry |
| 7,894,304 | B2 | | 2/2011 | Fisher |
| 8,281,496 | B1 | | 10/2012 | Mies |
| 9,846,034 | B2 | | 12/2017 | Hill |
| 9,863,768 | B2 | | 1/2018 | Hill |
| 10,006,768 | B2 | | 6/2018 | Spaulding |
| 2004/0221462 | A1 | * | 11/2004 | Liao ..................... G01C 15/008 33/286 |
| 2005/0172502 | A1 | * | 8/2005 | Sergyeyenko ....... G01C 15/004 33/286 |
| 2007/0271800 | A1 | * | 11/2007 | Hersey ................. G01C 15/004 33/286 |
| 2009/0307913 | A1 | * | 12/2009 | Schulze ................. G01C 15/02 33/1 G |
| 2014/0259706 | A1 | * | 9/2014 | Page .................. B60K 31/0008 33/228 |
| 2020/0116485 | A1 | * | 4/2020 | Melton ................ G01C 15/004 |
| 2020/0132838 | A1 | * | 4/2020 | McGill ................ G01C 15/008 |

FOREIGN PATENT DOCUMENTS

| | | | | |
|---|---|---|---|---|
| DE | 102013217479 | A1 * | 3/2015 | .......... G01C 15/004 |
| WO | WO-2009050057 | A1 * | 4/2009 | .......... G01S 17/875 |
| WO | WO-2013120271 | A1 * | 8/2013 | .............. G01C 9/12 |
| WO | WO-2020051784 | A1 * | 3/2020 | .......... G01C 15/004 |

* cited by examiner

*Primary Examiner* — Christopher W Fulton
(74) *Attorney, Agent, or Firm* — Cramer Patent & Design PLLC; Aaron R. Cramer (57) ABSTRACT

A self-leveling laser divider incorporates a self-leveling laser projection unit that is capable of being secured upon a tripod. The laser projection unit comprises a plurality of switches to selectively project a desired amount of divisions of measurement indicia on to a chosen surface.

20 Claims, 6 Drawing Sheets

SELF-LEVELLING LASER DIVIDER

RELATED APPLICATIONS

The present invention was first described in and claims the benefit of U.S. Provisional Patent Application No. 62/796,164 filed on Jan. 24, 2019, the entire disclosures of which are incorporated herein by reference.

FIELD OF THE INVENTION

The present invention relates generally to levels and specifically to a self-levelling laser divider.

BACKGROUND OF THE INVENTION

One of the most common uses for a tape measure is that of finding the middle point of a wall so that pictures can be centered, wall coverings can be applied, or shelves can be installed. This not only requires measurements be made in both the horizontal and vertical axis, but that math be performed to provide for equally sized sections. Repeated measurements are often required and perhaps another person to hold the end of the tape measure, all providing ample opportunity for mistakes to be made.

While pictures can be moved with little to no cost, other objects such as cabinets, drapery overhangs, and the like may result in rework cost. Should floor tile or ceiling tile be mistakenly installed, it may result in an error that the homeowner is forced to see every day. Accordingly, there exists a need for a means by which items being installed on a wall, ceiling, or floor area can be laid out with little to no chance for measuring or math errors in an effort to address the above problem. The development of the self-leveling laser divider provides this solution.

SUMMARY OF THE INVENTION

To achieve the above and other objectives, the present invention provides for a layout device comprising an outer enclosure which has a bottom, a front face, a top face, a first side, a second side, and a rear side, a tripod mount which is disposed on the bottom of the outer enclosure to mount a camera tripod on to aid in initially aiming the camera, a vertical surface laser emitter lens which is mounted on the front face of the outer enclosure to allow the layout device to work on a vertical surface, a horizontal surface laser emitter lens which is mounted on the top face of the outer enclosure to use the layout device on a horizontal surface, an x-axis horizontal spread adjustment control which is disposed on the first side of the outer enclosure, a y-axis horizontal spread adjustment control which is disposed on the second side of the outer enclosure and a control panel which is disposed on the rear side of the outer enclosure.

The control panel includes a vertical selector and control switch for selection of various vertical adjustments by one or more other devices on the control panel, a horizontal selector and control switch for selection of various horizontal adjustments by the one or more other devices on the control panel, and a numerical readout that allows for indication of a number of divisions displayed by the layout device in either a vertical position or a horizontal position as selected by the vertical selector and control switch or the horizontal selector and control switch.

The layout device also comprises a division selector control which selects a number of a plurality of vertical divisions and a number of a plurality of horizontal divisions. The number of the vertical divisions and the number of the horizontal divisions are displayed on a numerical readout disposed on the control panel. The layout device also comprises a wall and ceiling selector switch selecting the vertical surface laser emitter lens or the horizontal surface emitter lens depending on intended usage of the layout device. The wall and ceiling selector switch is disposed on the control panel. The layout device also comprises a vertical tilt adjustment aiming and dividing one or more specific areas. The vertical tilt adjustment is disposed on the control panel. The layout device also comprises an input keypad and an alphanumeric readout resolving and displaying the one or more specific areas resolved and divided based on a distance of an X-axis beam and a Y-axis beam from the layout device to the one or more specific areas resolved and divided and an angle between the beams. The input keypad and the alphanumeric readout are disposed on the control panel to the surface and a display selector switching the layout device between the number of the vertical divisions and the number of the horizontal divisions data and the one or more specific areas resolved and divided data.

The outer enclosure may include a plurality of rounded corners to prevent unintentional snagging of equipment, clothing or personnel. The outer enclosure may comprise a cube shape and may be four inches in length. The tripod may be adjustable in height, approach angle and skew angle. The vertical surface may be a wall while the horizontal surface may be a floor or a ceiling. The vertical surface laser emitter lens and horizontal surface laser emitter lens may each be shaped as five identical squares. The five identical squares may be shaped as a plus sign.

The five identical squares may be made of transparent material. The vertical selector and control switch may align an outer laser line with a ceiling edge the vertical surface or the vertical selector and control switch may align the outer laser line with a floor edge of the vertical surface. The divisions are in the range of two divisions to ninety-nine divisions. The divisions may be provided by a vertical division laser line and a horizontal division laser line. A user may provide one or more semi-permanent markings using a marking device over the top of the vertical division laser line and the horizontal division laser line.

The one or more specific areas may be a door or a window. The electrical outputs from the microprocessor controller may be the numerical readout. The alphanumeric readout along with a vertical laser assembly and a horizontal laser assembly may be used on the vertical surface. The layout device may further comprise an internal battery providing electrical power to a microprocessor controller and a plurality of electrical inputs to the microprocessor controller which may be the vertical selector and control switch, the horizontal selector and control switch, the division selector control, the wall and ceiling selector switch, the wall and ceiling selector switch, the vertical tilt adjustment, the display selector, and the input keypad.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 layout device
15 outer enclosure
20 tripod mount
25 vertical surface laser emitter lens
30 front face
35 horizontal surface laser emitter lens
40 top face
45 x-axis horizontal spread adjustment control
50 right face
55 y-axis horizontal spread adjustment control
60 left face
65 control panel
70 rear face
75 vertical selector/control switch
80 horizontal selector/control switch
85 numerical readout
90 division selector control
95 wall/ceiling selector switch
100 vertical tilt adjustment
105 input keypad
110 alphanumeric readout
115 display selector
120 vertical surface
125 tripod
130 outer laser line
135 ceiling edge
140 floor edge
145 vertical division laser line
150 horizontal division laser line
155 vertical surface
160 internal battery
165 microprocessor controller
170 vertical laser assembly
175 horizontal laser assembly
180 laser emitter
185 moving mirror
190 x-axis drive motor
195 y-axis drive motor

1. DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. DETAILED DESCRIPTION OF THE FIGURES

Figure 1:
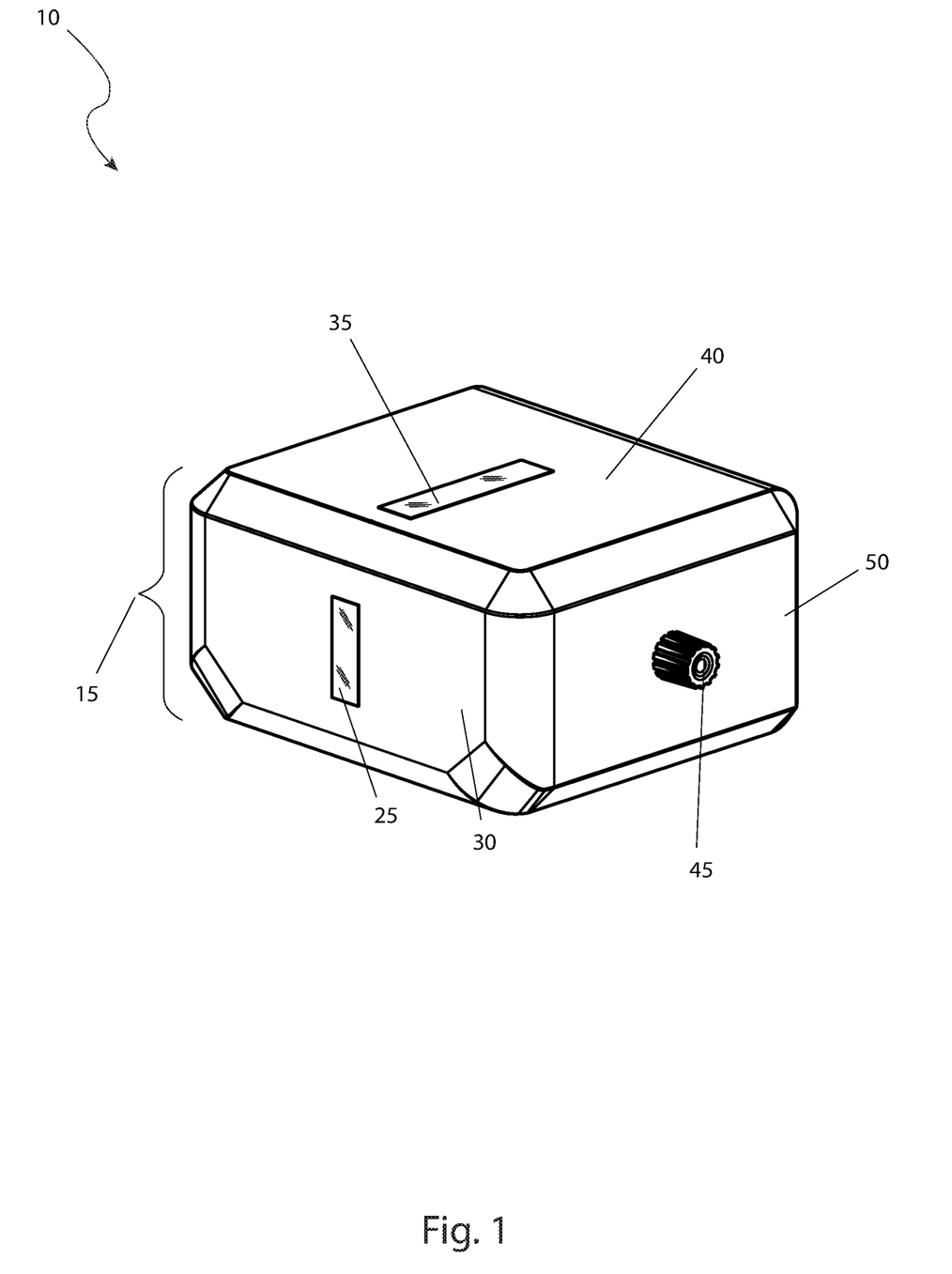
FIG. 1 is a perspective view of a layout device 10, according to the preferred embodiment of the present invention.
Figure 2:
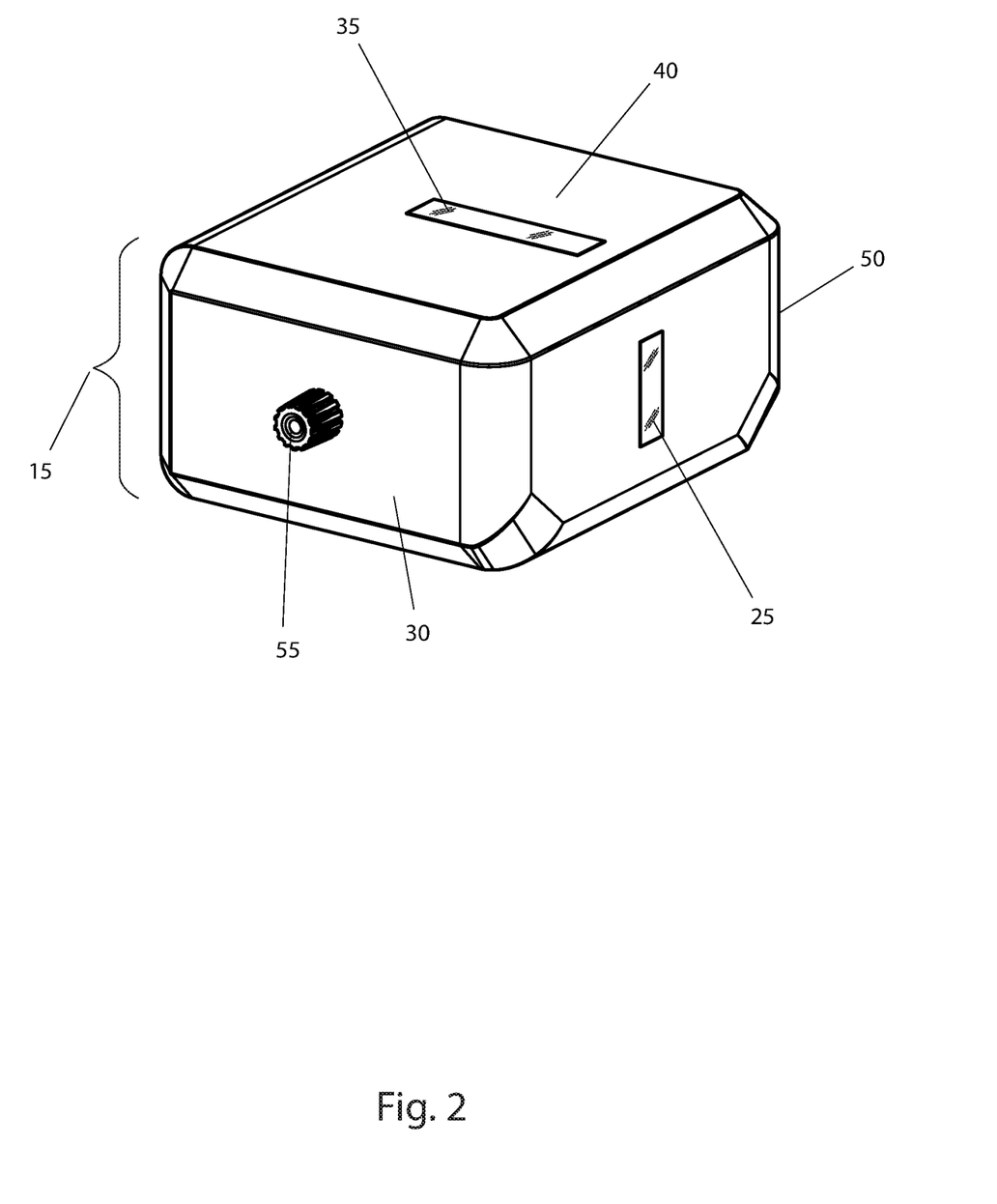
FIG. 2 is a perspective view of an opposite side of the layout device 10, according to the preferred embodiment of the present invention.

Referring now to FIG. 1, a perspective view of the layout device 10, according to the preferred embodiment of the present invention is disclosed. The layout device 10 (herein also described as the "device") 10, includes an outer enclosure 15 in the shape of a cube with the approximate dimensions of four inches (4 in.) on any side. The outer enclosure 15 may have rounded corners to limit the unintentional snagging of equipment, clothing or personnel. The bottom of the device 10 is provided with a tripod mount 20 for purposes of mounting on a common camera tripod to aid in initial aiming. A vertical surface laser emitter lens 25 is mounted on a front face 30 to allow for use of the device 10 on vertical surfaces such as walls. A horizontal surface laser emitter lens 35 is mounted on a top face 40 to allow for use of the device 10 on horizontal surfaces such as ceilings or floors. The vertical surface laser emitter lens 25 and horizontal surface laser emitter lens 35 are each preferably shaped as a set of five (5) identical squares of transparent material shaped generally as a "plus" sign (+), although other shapes are envisioned to fall under the scope of the present invention. An x-axis horizontal spread adjustment control 45 is depicted on the right face 50. Likewise, a y-axis horizontal spread adjustment control 55 (not shown due to illustrative limitations) is depicted on the left face 60 (not shown due to illustrative limitations). A control panel 65 is provided on the rear face 70 (please see FIG. 2). Further description on the usage of the x-axis horizontal spread adjustment control 45, the y-axis horizontal spread adjustment control 55 and the control panel 65 will be provided herein below.

Figure 3:
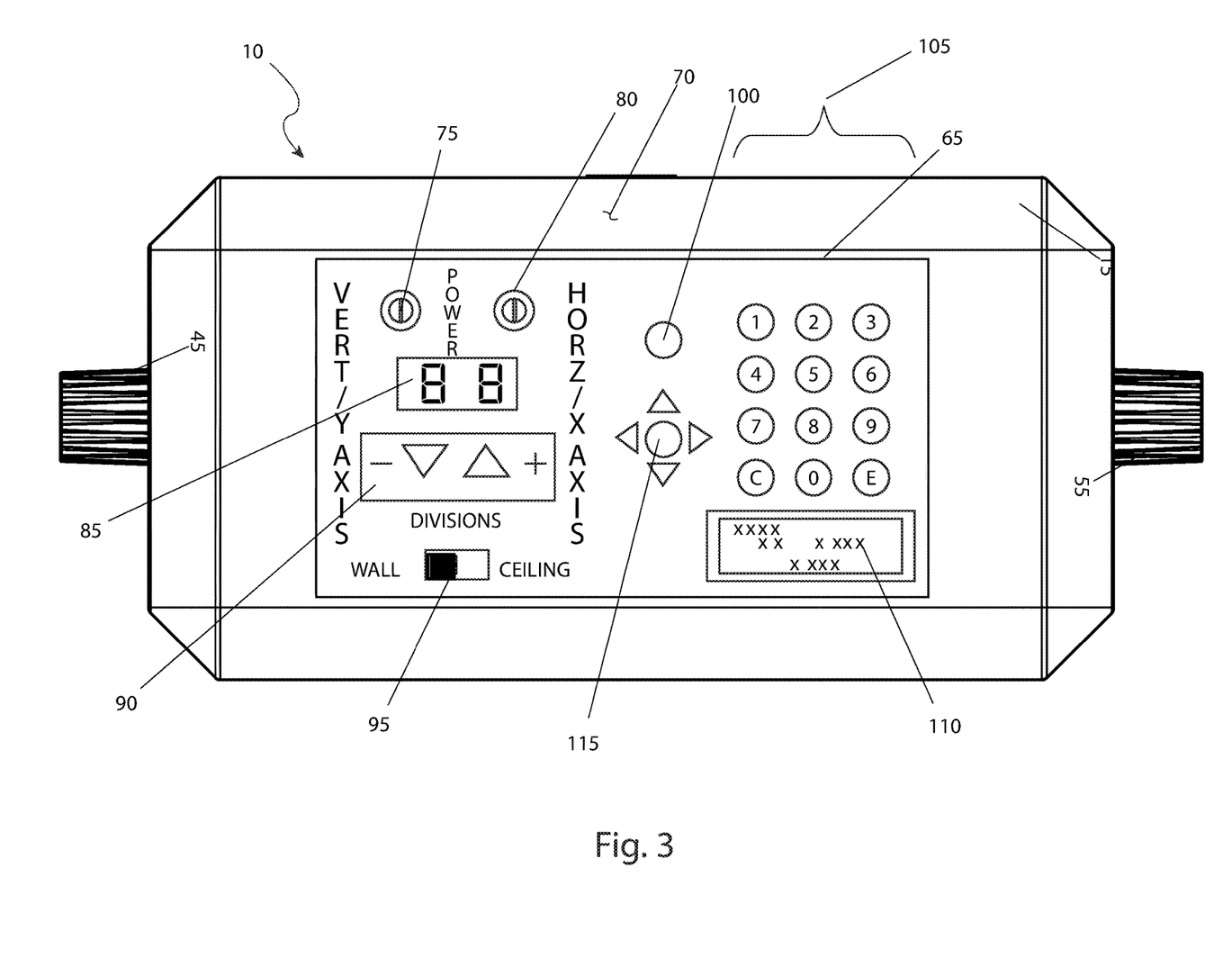
FIG. 3 is a face view of a rear side 70 of the layout device 10, showing a control panel 65 as provided with the layout device 10, according to the preferred embodiment of the present invention.

Referring next to FIG. 3, a face view of the control panel 65 on the rear face 70 of the outer enclosure 15 as provided with the device 10, according to the preferred embodiment of the present invention is depicted. The control panel 65 provides control devices as follows: a vertical selector/control switch 75 allows for selection of various vertical adjustments by other devices on the control panel 65. A horizontal selector/control switch 80 allows for selection of various horizontal adjustments by other devices on the control panel 65. A numerical readout 85 allows for indication of the number of divisions displayed by the device 10 in either the vertical or horizontal position as selected by the vertical selector/control switch 75 or the horizontal selector/control switch 80. The number of divisions envisioned as being selectable range from two (2) to ninety-nine (99). A division selector control 90 allows for user selection of the number of vertical or horizontal divisions (as selected by the vertical selector/control switch 75 or the horizontal selector/control switch 80) to be displayed by the device 10. The selected number of respective divisions is displayed upon the numerical readout 85. A wall/ceiling selector switch 95 allows for use of either the vertical surface laser emitter lens 25 (as shown in FIG. 1) or the horizontal surface emitter lens 35 (as shown in FIG. 1) depended on intended usage of the device 10. Both wall and ceiling/floor usage of the device 10 will be described in greater detail herein below.

A vertical tilt adjustment 100 allows for aiming and dividing specific areas, such as above a door or window. An input keypad 105 and an alphanumeric readout 110 allow the device 10 to resolve and display the width and height of the area to be divided based on the distance of the x and y axis beams from the device 10 to the surface and the angle between the beams. The resultant calculation will allow the device 10 to accurately divide the area even if the unit is not perpendicular to the surface being divided. A display selector 115 allows the device 10 to switch between number of divisions and area of surface. The alternate usage would be beneficial for painters, wallpaper hangers, siding installers, and the like.

Figure 4:
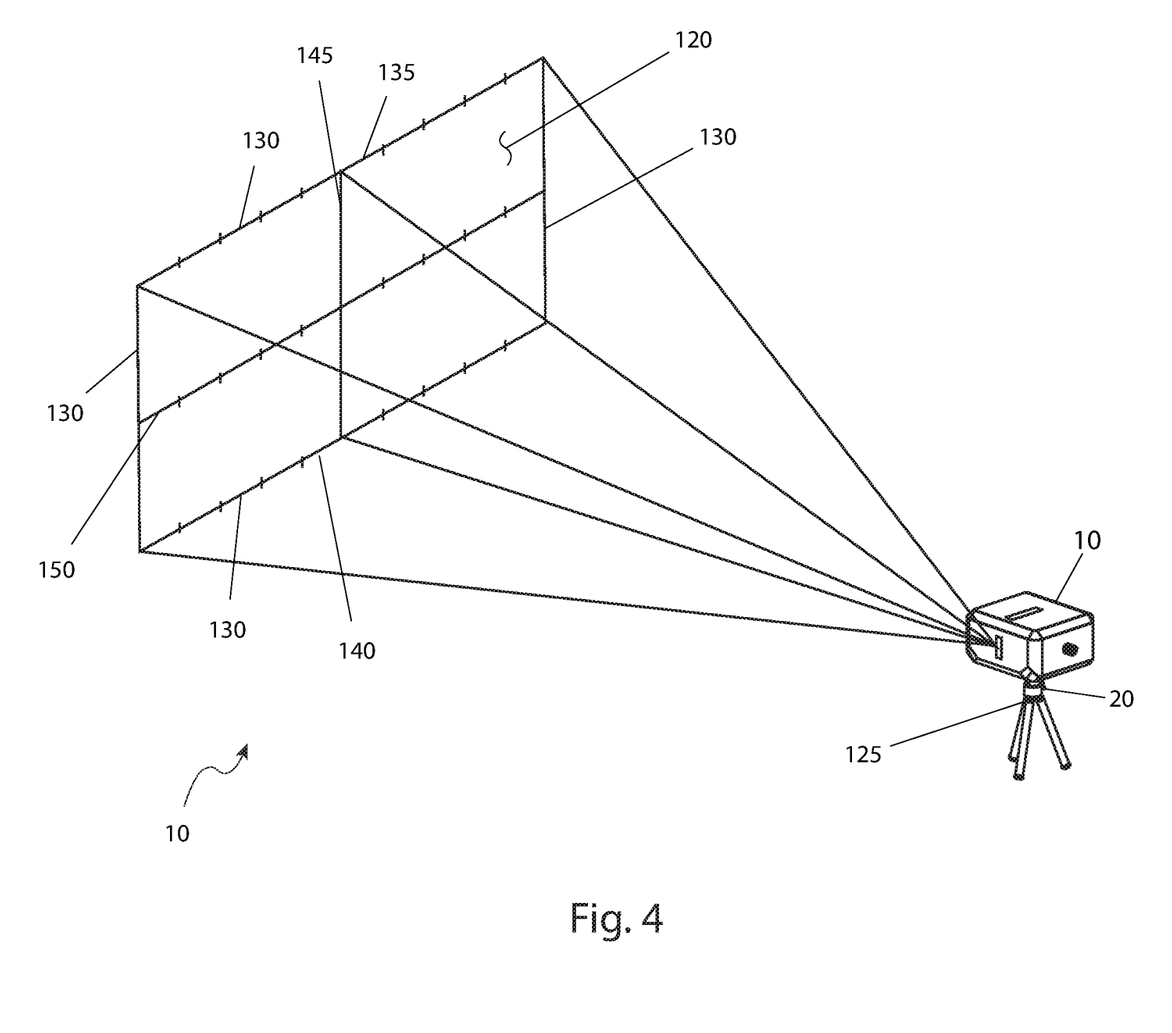
FIG. 4 is a perspective view of the layout device 10, shown in a utilized state on a vertical surface 120, according to the preferred embodiment of the present invention.

Referring now to FIG. 4, a perspective view of the device 10, shown in a utilized state on a vertical surface 120, according to the preferred embodiment of the present invention is shown. The vertical surface 120 is primarily envisioned to be a wall, either interior or exterior. The wall/ceiling selector switch 95 (as described in FIG. 3) would be placed in the "wall" position for said usage. The device 10 is mounted atop a tripod 125, similar to that used in photography, via the tripod mount 20. The tripod 125 is envisioned to be adjustable in height, approach angle and skew angle as is customarily expected. The device 10 is mechanically connected to the tripod 125 via the tripod mount 20 (not shown in this figure due to illustrative limitations).

With the device 10 energized, the vertical selector/control switch 75 (as described in FIG. 3) is used to align an outer laser line 130 with either the ceiling edge 135 or a floor edge 140 of the vertical surface 120. The opposite spread is then adjusted with the x-axis horizontal spread adjustment control 45 (as described in FIG. 1). Likewise, vertical adjustments are then defined by the horizontal selector/control switch 80 (as described in FIG. 3) and the y-axis horizontal spread adjustment control 55 (as described in FIG. 1) in a similar manner. This process then defines the area on the vertical surface 120 under measurement or calculation. Next, the number of vertical and horizontal divisions desired for display are entered via the numerical readout 85 (as described in FIG. 2) and division selector control 90 (as described in FIG. 3). For purposes of illustration a total of two (2) each are displayed in FIG. 4. A vertical division laser line 145 and a horizontal division laser line 150 provide said divisions. The user then provides semi-permanent markings using a pencil or other marking device over the top of the vertical division laser line 145 and/or horizontal division laser line 150 allowing for de-energization and removal of the device 10 and associated tripod 125. These divisional markings are then utilized for placement of pictures in a centered and symmetrical manner, shelving to be hung in a horizontal and level manner, and cabinets and draperies to be hung. Even placement of doors and windows can be determined during rough carpentry stages. The boundary defined by the outer laser line 130 can be utilized by the device 10 to perform length/width/area calculations envisioned to be beneficial when determining quantities/coverage of paint, wallcoverings, siding and the like.

Figure 5:
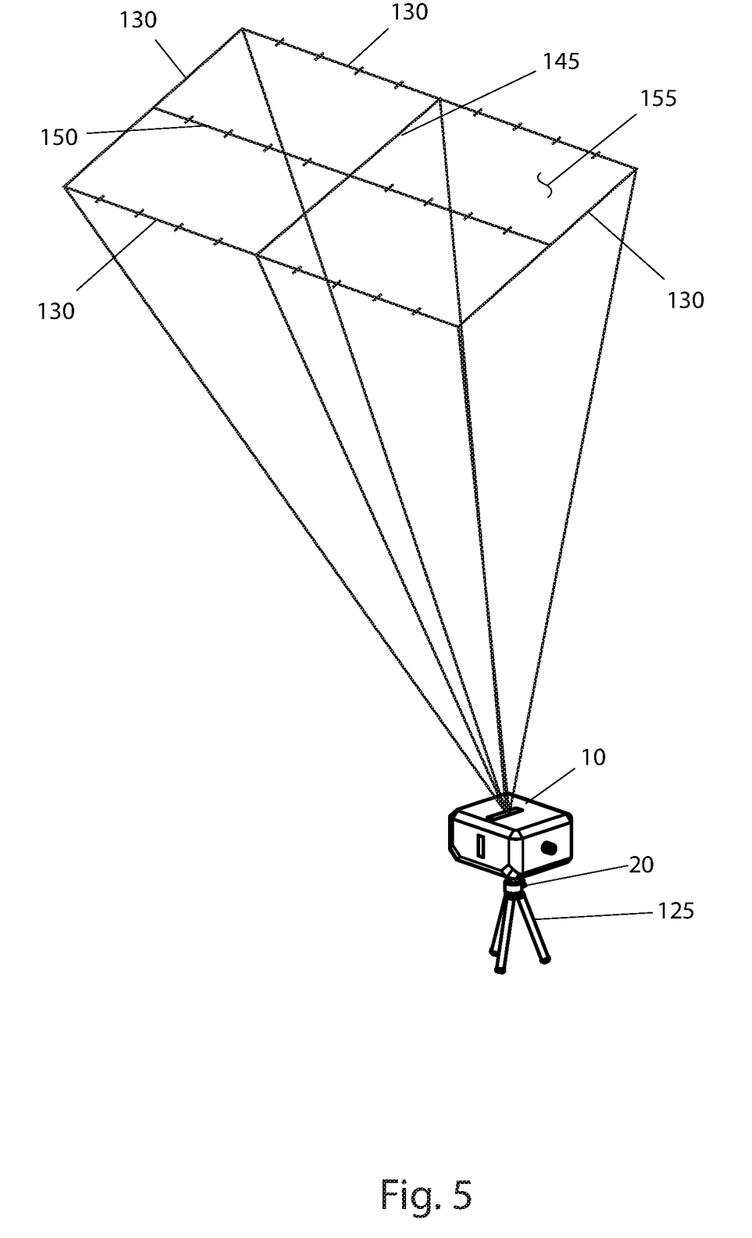
FIG. 5 is a perspective view of the layout device 10, shown in a utilized state on a vertical surface 155 according to the preferred embodiment of the present invention; and, FIG. 6 is an electrical block diagram of the layout device 10, according to the preferred embodiment of the present invention.

Referring next to FIG. 5, a perspective view of the device 10, shown in a utilized state on a vertical surface 155 according to the preferred embodiment of the present invention is disclosed. The vertical surface 155 is envisioned to be a ceiling as shown or could also be a floor depending on aiming and configuration of the tripod 125. The wall/ceiling selector switch 95 (as described in FIG. 3) would be placed in the "ceiling" position for said usage. As before, the device 10 is mounted atop a tripod 125 via the tripod mount 20.

With the device 10 energized, the vertical selector/control switch 75 (as described in FIG. 3) is used to align an outer laser line 130 with the outer edge of the vertical surface 155. The opposite spread is then adjusted with the x-axis horizontal spread adjustment control 45 (as described in FIG. 1). Likewise, the opposite adjustment (perpendicular to prior adjustment) are then defined by the horizontal selector/control switch 80 (as described in FIG. 3) and the y-axis horizontal spread adjustment control 55 (as described in FIG. 1) in a similar manner. This process then defines the area on the vertical surface 155 under measurement or calculation. Next, the number of vertical and horizontal divisions desired for display are entered via the numerical readout 85 (as described in FIG. 3) and division selector control 90 (as described in FIG. 3). For purposes of illustration a total of two (2) each are displayed in FIG. 5. A vertical division laser line 145 and a horizontal division laser line 150 provide said divisions. The user then provides semi-permanent markings using a pencil or other marking device over the top of the vertical division laser line 145 and/or horizontal division laser line 150 allowing for de-energization and removal of the device 10 and associated tripod 125. These divisional markings are then utilized for placement of objects such as light fixtures, ceiling fans ore the like in a centered and/or symmetrical manner. Even placement of items such as recessed ceilings, tray ceilings, drop ceilings and the like can be determined during rough carpentry stages. The boundary defined by the outer laser line 130 can be utilized by the device 10 to perform length/width/area calculations envisioned to be beneficial when determining quantities/coverage of paint, ceiling tiles, texture treatment and the like in the case of ceilings or carpeting, floor covering, tile, or the like in the case of floors.

Figure 6:
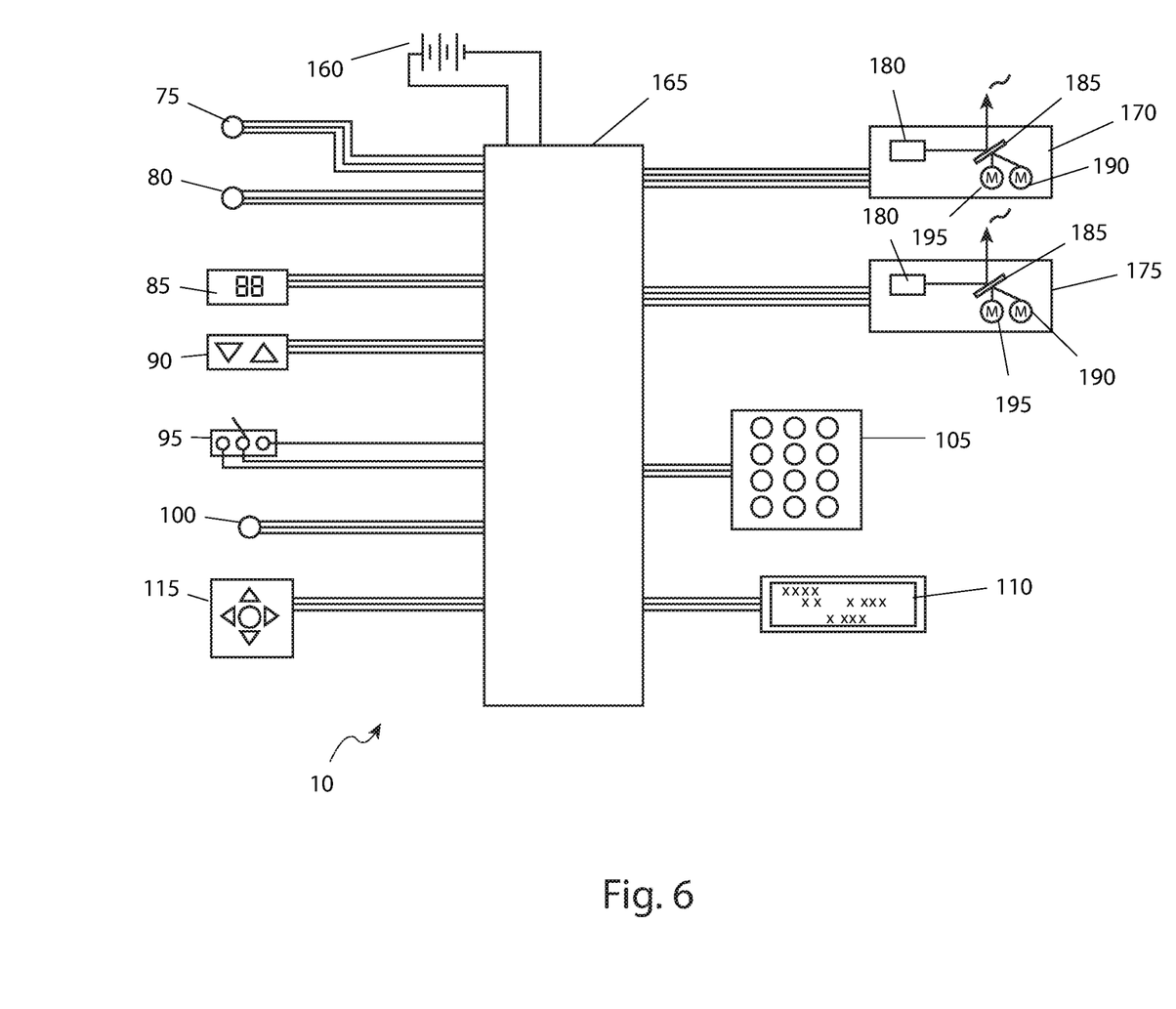

Referring to FIG. 6, an electrical block diagram of the device 10, according to the preferred embodiment of the present invention is depicted. Due to its portable operation, the device 10 utilizes an internal battery 160 to provide electrical power to a microprocessor controller 165. Electrical inputs to the microprocessor controller 165 are provided by the vertical selector/control switch 75, the horizontal selector/control switch 80, the division selector control 90, the wall/ceiling selector switch 95, the wall/ceiling selector switch 95, the vertical tilt adjustment 100, the display selector 115, and the input keypad 105. Electrical outputs from the microprocessor controller 165 are the numerical readout 85, the alphanumeric readout 110 along with a vertical laser assembly 170 (used on vertical surface 120, as shown in FIG. 4) and a horizontal laser assembly 175 used on vertical surface 155 (a shown in FIG. 5). Both the vertical laser assembly 170 and the horizontal laser assembly 175 include a laser emitter 180, a moving mirror 185, an x-axis drive motor 190 and a y-axis drive motor 195, which operate in the customary and expected manner.

3. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 6. The user would procure the device 10 through conventional procurement channels such as supply houses, tool distributors, and home improvement stores.

After procurement and prior to utilization, the device 10 would be prepared in the following manner: an internal battery 160 would be placed in the device 10; the device 10 would be installed upon the tripod 125 using the tripod mount 20; and the device 10 would be generally aimed at either a vertical surface 120 or a vertical surface 155 depending on the intended use.

During utilization of the device 10, the following procedure would be initiated: the wall/ceiling selector switch 95 would be placed in the "wall" or 'ceiling" position dependent upon the specific intended usage; the vertical selector/control switch 75 is used to align an outer laser line 130 with either the ceiling edge 135 or a floor edge 140 dependent on the specific application; the opposite spread is then adjusted with the x-axis horizontal spread adjustment control 45; perpendicular adjustments are then defined by the horizontal selector/control switch 80 and the y-axis horizontal spread adjustment control 55; desired number of vertical and horizontal divisions desired for display are entered via the numerical readout 85 and division selector control 90 and displayed via the vertical division laser line 145 and the horizontal division laser line 150; semi-permanent markings using a pencil or other marking device are then made over the top of the vertical division laser line 145 and/or horizontal division laser line 150; additional divisions are made as required repeating this said process. After use of the device 10, it is de-energized, removed and stored until needed again in a repeating manner.

The usage as defined provides the following benefits over conventional measuring, dividing, and marking methods: process is self-leveling; can be performed by a single person; eliminates calculation errors; portable operation, simple to use; provides accurate length, width; and area calculations for material coverage purchases; and results in a completely accurate layout in only a few minutes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A layout device, comprising:
   an outer enclosure having a bottom, a front face, a top face, a first side, a second side, and a rear side;
   a tripod mount disposed on the bottom of the outer enclosure to mount a camera tripod on to aid in initially aiming the camera;
   a vertical surface laser emitter lens mounted on the front face of the outer enclosure to allow the layout device to work on a vertical surface;
   a horizontal surface laser emitter lens mounted on the top face of the outer enclosure to use the layout device on a horizontal surface;
   an x-axis horizontal spread adjustment control disposed on the first side of the outer enclosure;
   a y-axis horizontal spread adjustment control disposed on the second side of the outer enclosure;
   a control panel disposed on the rear side of the outer enclosure, the control panel includes a vertical selector and control switch for selection of various vertical adjustments by one or more other devices on the control panel, a horizontal selector and control switch for selection of various horizontal adjustments by the one or more other devices on the control panel, and a numerical readout that allows for indication of a number of divisions displayed by the layout device in either a vertical position or a horizontal position as selected by the vertical selector and control switch or the horizontal selector and control switch;
   a division selector control selecting a number of a plurality of vertical divisions and a number of a plurality of horizontal divisions, the number of the vertical divisions and the number of the horizontal divisions are displayed on a numerical readout disposed on the control panel;
   a wall and ceiling selector switch selecting the vertical surface laser emitter lens or the horizontal surface emitter lens depending on intended usage of the layout device, the wall and ceiling selector switch is disposed on the control panel;
   a vertical tilt adjustment aiming and dividing one or more specific areas, the vertical tilt adjustment is disposed on the control panel;
   an input keypad and an alphanumeric readout resolving and displaying the one or more specific areas resolved and divided based on a distance of an X-axis beam and a Y-axis beam from the layout device to the one or more specific areas resolved and divided and an angle between the beams, the input keypad and the alphanumeric readout are disposed on the control panel to the surface; and
   a display selector switching the layout device between the number of the vertical divisions and the number of the horizontal divisions data and the one or more specific areas resolved and divided data.

2. The layout device according to claim 1, wherein the outer enclosure includes a plurality of rounded corners to prevent unintentional snagging of equipment, clothing or personnel.

3. The layout device according to claim 1, wherein the outer enclosure has a cube shape.

4. The layout device according to claim 3, wherein the cube shape includes the sides are four inches in length.

5. The layout device according to claim 1, wherein the tripod is adjustable in height, approach angle and skew angle.

6. The layout device according to claim 1, wherein the vertical surface is a wall.

7. The layout device according to claim 1, wherein the horizontal surface is a floor.

8. The layout device according to claim 1, wherein the horizontal surface is a ceiling.

9. The layout device according to claim 1, wherein the vertical surface laser emitter lens and horizontal surface laser emitter lens are each shaped as five identical squares.

10. The layout device according to claim 9, wherein the five identical squares are shaped as a plus sign.

11. The layout device according to claim 9, wherein the five identical squares are made of transparent material.

12. The layout device according to claim 1, wherein the vertical selector and control switch aligns an outer laser line with a ceiling edge the vertical surface.

13. The layout device according to claim 12, wherein the vertical selector and control switch aligns the outer laser line with a floor edge of the vertical surface.

14. The layout device according to claim 1, wherein the divisions are in the range of two divisions to ninety-nine divisions.

15. The layout device according to claim 1, wherein the divisions are provided by a vertical division laser line and a horizontal division laser line.

16. The layout device according to claim 15, wherein a user provides one or more semi-permanent markings using a marking device over the top of the vertical division laser line and the horizontal division laser line.

17. The layout device according to claim 1, wherein the one or more specific areas is a door.

18. The layout device according to claim 1, wherein the one or more specific areas is a window.

19. The layout device according to claim 1, wherein the electrical outputs from the microprocessor controller are the numerical readout, the alphanumeric readout along with a vertical laser assembly and a horizontal laser assembly used on the vertical surface.

20. The layout device according to claim 1, further comprising an internal battery providing electrical power to a microprocessor controller, a plurality of electrical inputs to the microprocessor controller are provided by the vertical selector and control switch, the horizontal selector and control switch, the division selector control, the wall and ceiling selector switch, the wall and ceiling selector switch, the vertical tilt adjustment, the display selector, and the input keypad.

* * * * *